(No Model.)
A. H. BELL.
HARROW.
No. 325,151. Patented Aug. 25, 1885.
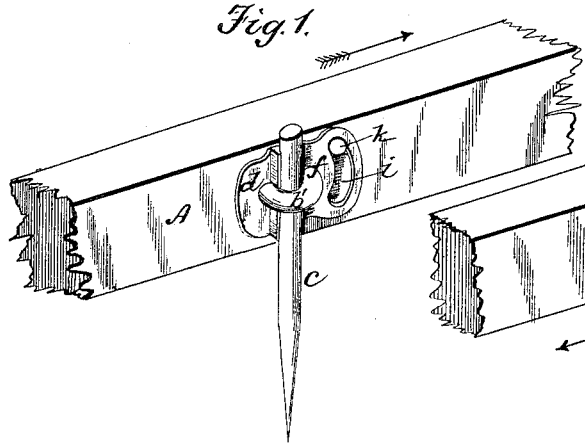
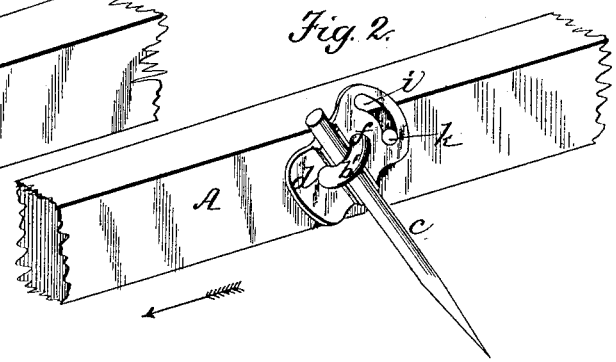
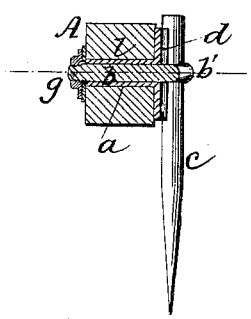
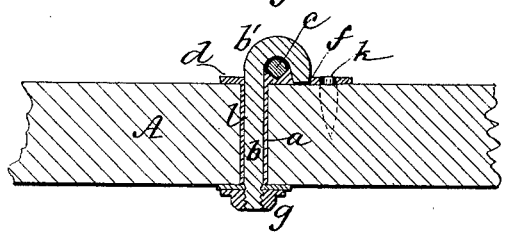
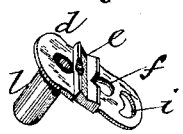
WITNESSES
J. C. Huntemann
W. C. Chaffee
INVENTOR
Azel H. Bell,
by Johnson and Johnson
Attys.

UNITED STATES PATENT OFFICE.

AZEL H. BELL, OF BELLE PLAINE, IOWA.

HARROW.

SPECIFICATION forming part of Letters Patent No. 325,151, dated August 25, 1885.

Application filed July 24, 1884. (No model.)

*To all whom it may concern:*

Be it known that I, AZEL H. BELL, a citizen of the United States, residing at Belle Plaine, in the county of Benton and State of Iowa, have invented new and useful Improvements in Harrows, of which the following is a specification.

My invention relates to that class of harrows in which the teeth are arranged and secured so as to render the harrow serviceable for both breaking and smoothing in harrowing land, as is well understood.

My improvements look to a novel construction for securing the harrow-teeth in such harrows which, when being hitched at one end, have their teeth vertical for "breaking," and when hitched at the other end the teeth are caused to assume an inclined position for "smoothing."

The harrow-frame may be of the usual construction and arrangement, having a hitching device at each end to make a reversible harrow, and the teeth are attached to the wood or bars at the usual intervals, and in any desired arrangement.

My invention is directed only to the manner of attaching the ordinary straight-shank pointed teeth to the wooden bars, so as to prevent splitting the bars by the fastening-bolts, and also in a manner to prevent the working loose of the fastening-bolts. These advantages are important, and they are effected by clamping the tooth to its bearing-plate by the eyed bolt, providing a bearing-sleeve for the latter, and clamping the bolt to the end of said bearing-sleeve by the nut, so that all turn together as a single fastening device, the strain upon the fastening-bolt being borne by the sleeve, and the nut turning with the latter in using the harrow with the teeth in vertical or in inclined position.

In the accompanying drawings, Figure 1 represents a view in perspective of a portion of the bar or wood of the harrow-frame, showing a tooth and its attachment supporting it in vertical position for breaking; Fig. 2, a similar view showing the tooth supported in inclined position for smoothing when the harrow is reversed; Fig. 3, a vertical cross-section through the bar and tooth-fastening; Fig. 4, a horizontal longitudinal section and Fig. 5 a detail of the holding-plate for the tooth.

The drawings show the construction, and the objects of my improvements are, first, to provide a reversible tooth-attaching device which shall not be liable to split the bar or be affected by the shrinking or swelling of the wood, which in other devices loosens the bolt; second, to provide means for holding either a round or a square tooth at different depths, and for removal when necessary, it not being required to bend the tooth or notch it to keep it in place.

In the drawings, A is a portion of the bar or wood of any suitable form and construction of harrow-frame, which bar is bored at the usual intervals for the teeth-fastening devices, the holes *a* being bored horizontally. These holes are for the reception of eyed clamping or grip bolts *b*, which hold the teeth *c*, and the said bolts pass through plates *d*, which are formed or cast with face-grooves *e* for the securement of the teeth in connection with the eyed clamping or grip bolts. This securement is effected by providing a socket, *f*, in said plate *d* to receive the eye-forming end *b'* of the bolt. Then, the tooth being adjusted in the groove *e* for the desired depth, the grip bolt is clamped upon said tooth by a washer and screw-nut, *g*, or by a key from the other side of the bar, which bears upon the end of the sleeve-bearings. This construction permits the tooth to be rigidly clamped at the desired depth and locks the grip-bolt with the plate; but in order to change the angle of the tooth from a vertical position for breaking to an inclined position for smoothing I provide the plate *d* with a segmental slot, *i*, which confines the movement of said plate upon and with its pivot-bolt. For this purpose the wood or bar has a stop-pin, *k*, to limit the upward or downward movement of the slotted plate to bring the clamped tooth in vertical or into inclined position with reference to the harrow-bar, as will be readily understood; but any other suitable mechanical arrangement might be used for the particular purpose of confining the movement of the tooth-carrying plate to shift the position of the tooth.

I have described a harrow-tooth fastening which would make a good securement; but I prefer that the plate should have a hollow shank or bearing, *l*, to pass through the bored hole in the wood and receive the clamping or grip bolt. This construction is preferred, because the bolt could not then be affected by the shrinking or swelling of the wood, since it would pass through a close-fitting sleeved bearing and be bolted upon the other side of the wood, as before stated. This sleeve-bearing may or may not be integral with the plate and be used without the slotted plate. Its function as a bearing in either case will prevent the splitting of the wood and maintain a firm seat for the grip-bolt. In such case the end of the sleeve would bear against the bolt, and the latter would turn with said sleeve. In any case the clamping action of the nut or key and washer is upon the end of the sleeve.

I do not claim fastening a harrow-tooth by an eyed bolt, and a bearing-plate having a grooved seat for said bolt, and a slot and stop for determining the inclination of the bolt; but for obtaining the advantages, I have stated my improvement consists of a construction and combination in which a grooved bearing slotted plate, a sleeve-bearing, an eyed bolt, and a clamping-nut are used in a manner to bind these parts firmly together as a single device, and prevent the clamping-nut from becoming unscrewed by the turning of the eyed bolt in changing the position of the tooth, because the nut is clamped upon the end of the bearing-sleeve, and not upon the harrow-bar, as in devices of this kind now in use.

I claim—

1. In a harrow having straight pointed teeth, the tooth-fastening device herein described, consisting of the following parts in combination: the bearing-plate $d$, having the face-groove $e$, the perforation $f$, and the slot $i$, the eyed grip-bolt $b$, the bearing-sleeve $l$, the nut $g$, and the stop $k$, the tooth being clamped to the grooved plate, and the said bolt clamped to the bearing-sleeve by the nut, whereby all the parts are clamped together without bringing the clamping-nut directly upon the harrow-bar, as shown and described.

2. The combination, in a harrow, of the tooth $c$, with a bearing-plate therefor having the face-groove $e$, the slot $i$, the perforation $f$, and the integral bearing-sleeve $l$, the latter opening in the bearing-plate on the side of the face-groove opposite the perforation $f$, the eyed grip-bolt $b$, the nut $g$, and the stop $k$, all constructed as shown and described, whereby the bolt and the tooth are prevented from turning independent of the bearing-plate, and the fastening device and its several parts are clamped upon the bearing-sleeve and move with it in changing the position of the teeth.

In testimony whereof I have hereunto set my hand in the presence of two subscribing witnesses.

AZEL H. BELL.

Witnesses:
L. T. SWEET,
S. S. SWEET.